Feb. 23, 1932.  C. R. LENDLE  1,847,013
STEAMING DEVICE
Filed Aug. 1, 1930  5 Sheets-Sheet 1

C. R. Lendle
INVENTOR
BY Victor J. Evans
ATTORNEY

Feb. 23, 1932. C. R. LENDLE 1,847,013
STEAMING DEVICE
Filed Aug. 1, 1930 5 Sheets-Sheet 2
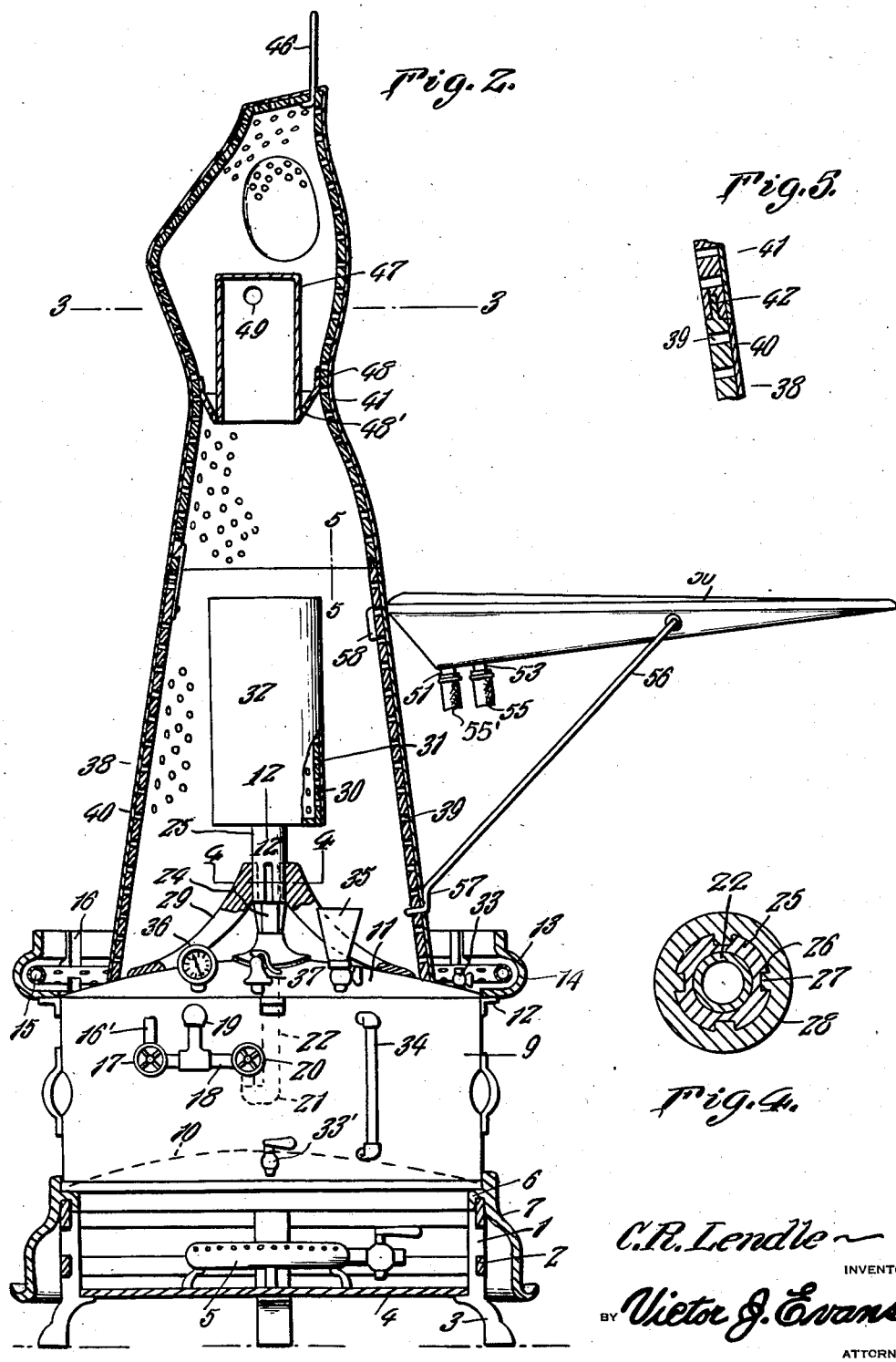

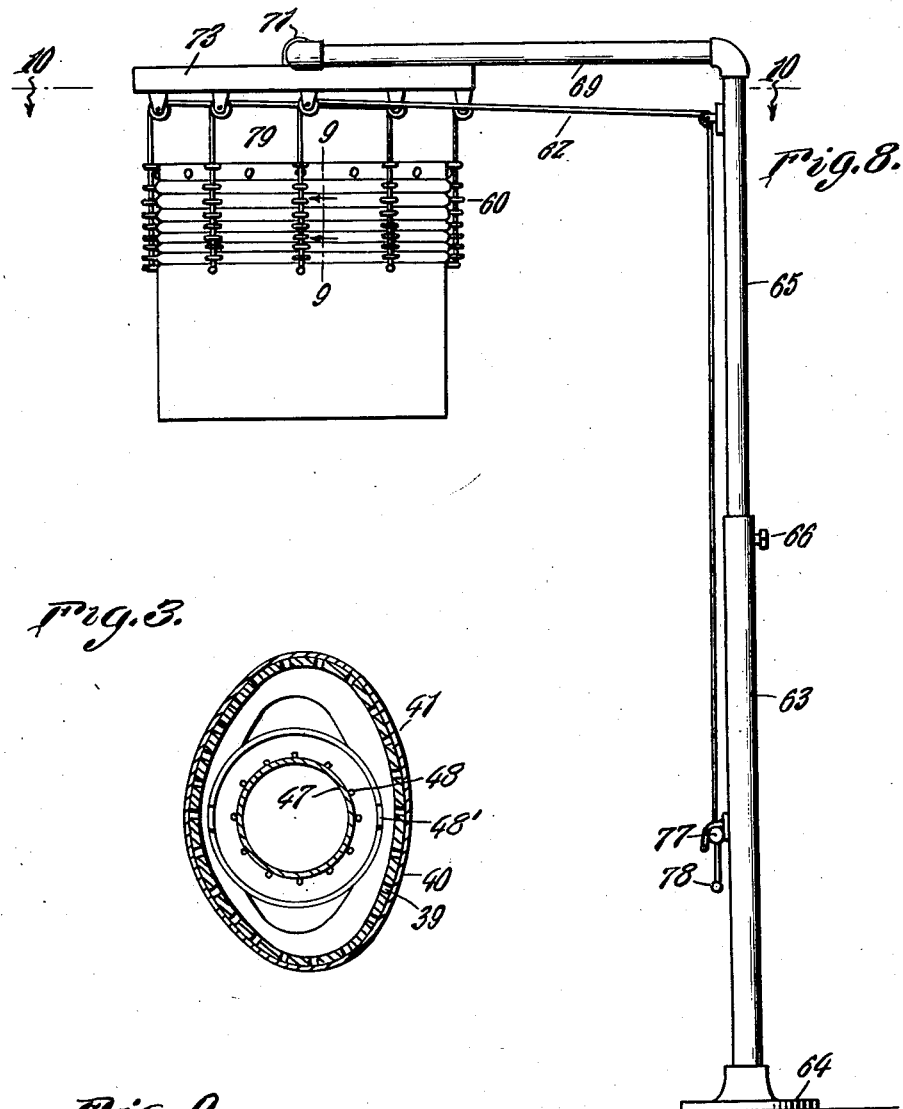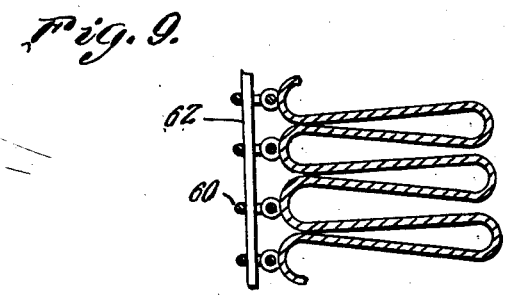

Feb. 23, 1932.    C. R. LENDLE    1,847,013
STEAMING DEVICE
Filed Aug. 1, 1930    5 Sheets-Sheet 4

C. R. Lendle
INVENTOR
BY Victor J. Evans
ATTORNEY

Feb. 23, 1932.   C. R. LENDLE   1,847,013
STEAMING DEVICE
Filed Aug. 1, 1930   5 Sheets-Sheet 5

C. R. Lendle
INVENTOR
BY Victor J. Evans
ATTORNEY

Patented Feb. 23, 1932

1,847,013

UNITED STATES PATENT OFFICE

CARL R. LENDLE, OF CHICAGO, ILLINOIS, ASSIGNOR, BY MESNE ASSIGNMENTS, TO GARMENT STEAMER COMPANY OF AMERICA, OF CHICAGO, ILLINOIS, A CORPORATION OF ILLINOIS

STEAMING DEVICE

Substitute for abandoned application Serial No. 140,334, filed October 8, 1926. This application filed August 1, 1930. Serial No. 472,465.

My present invention has reference to a steaming device for cleaning and disinfecting garments and other articles worn by men, women and children. This is a substitute application for my abandoned application Serial No. 140,334, filed Oct. 8, 1926.

Another object is to simplify and generally improve the device for a similar purpose upon which I was granted U. S. Letters-Patent, No. 1,092,726, on April 7, 1914.

To the attainment of the foregoing the invention consists in the improvement as hereinafter described and definitely claimed.

In the drawings which accompany and form part of this application:

Figure 2 is a central transverse sectional view through the improvement, parts being in elevation and the canopy being removed.

Figure 3 is a sectional view on the line 3—3 of Figure 2.

Figure 4 is a sectional view on the line 4—4 of Figure 2.

Figure 5 is a detail sectional view approximately on the line 5—5 of Figure 2.

Figure 8 is a side elevation showing the canopy in raised and folded position.

Figure 9 is a detail sectional view approximately on the line 9—9 of Figure 8.

Figure 1:
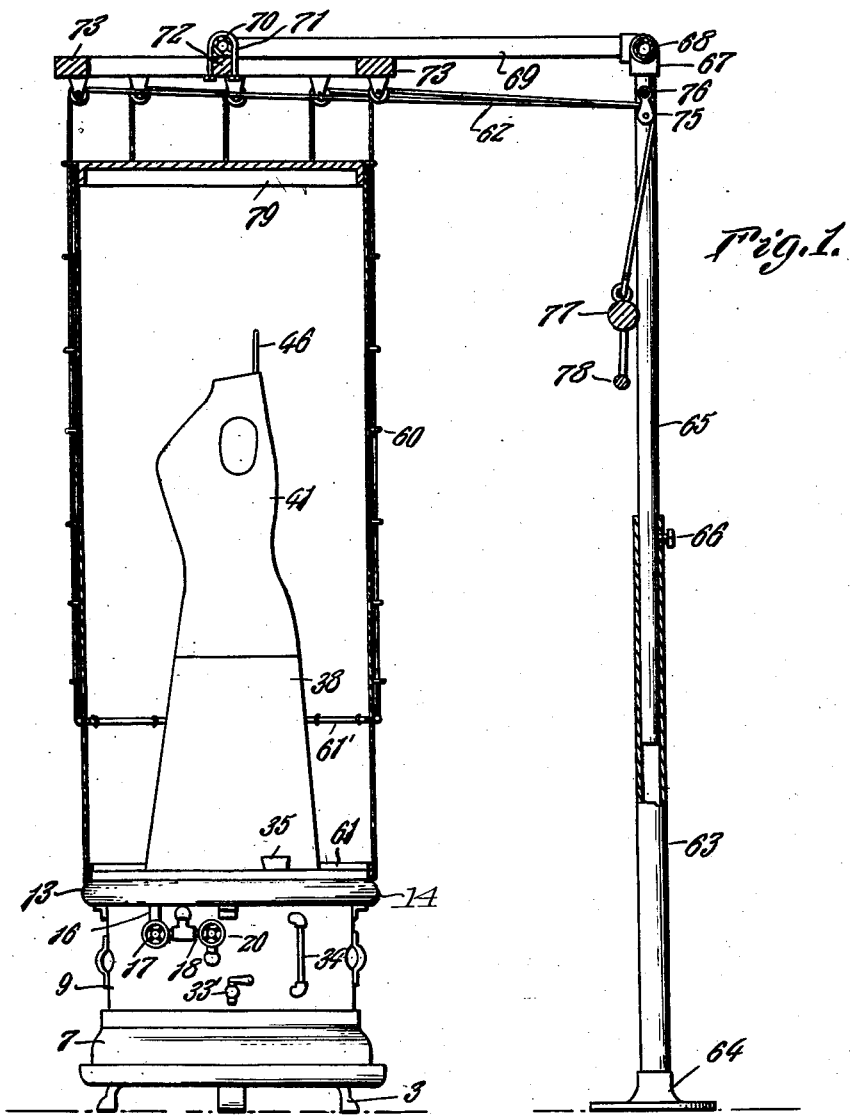
Figure 1 is a side elevation of the improvement, the canopy being in section, as is a part of the standard support for the canopy.
Figure 6:
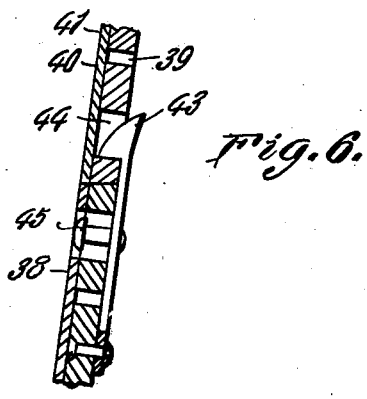
Figure 6 is a detail sectional view to illustrate the manner in which the upper section of the form is latched to the lower section thereof.
Figures 7, 13, 14:
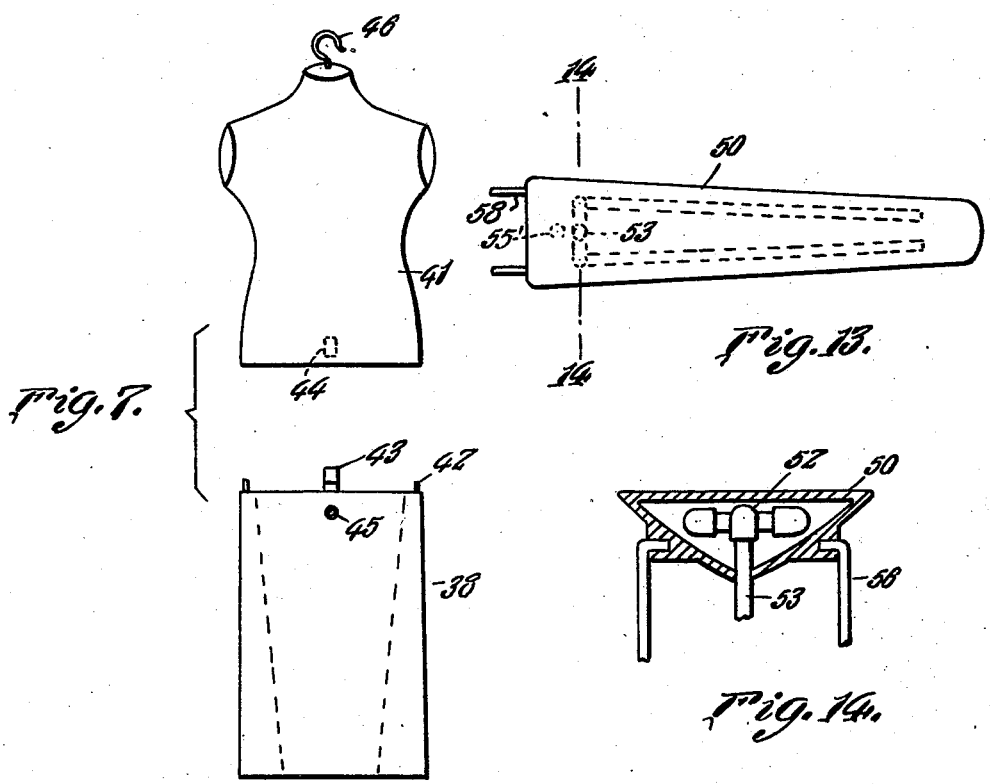
Figure 7 is an elevation of the form, the parts constituting the same being separated, the dotted lines in the lower section showing the manner in which the form may be built to accommodate a "hobble" skirt.
Figure 13 is a top plan view of the steaming board.
Figure 14 is a sectional view on the line 14—14 of Figure 13.

As set forth in my mentioned Patent No. 1,092,726, April 7, 1914, a chemical solution may be placed in the water which is generated into steam so that the vapors therefrom will produce a disinfectant for eliminating germs and removing all impurities from the garments treated by the improvement without leaving an unpleasant odor.

Referring now to the drawings in detail, the numeral 1 broadly designates the supporting base of the improvement. The support is made up of spaced ring members 2 to which are connected the upper portions of legs 3. The ring members 2 are let in the legs, and the said legs, slightly below the lower ring member 2, are provided with inwardly directed lugs on which there is seated a disc 4 having an asbestos or similar fire-proof facing, and on this disc the heater 5 rests. The heater is preferably in the nature of a gas burner.

The legs 3 of the base support upon their upper ends the inwardly directed flange 6 of a metal skirt 7. The skirt 7 prevents blasts of wind from interfering with the flame from the burner but the space between the bottom of the skirt and the open space for the burner permit free flow of air to the burner. The asbestos covered bottom of the base protects the floor from the heat of the burner. The ring flange 6 has its inner edge formed with a continuous down-turned lip 8, which engages with the upper ring 2 of the base. The horizontal flange 6 of the skirt provides a seat for a boiler 9. The boiler is round in cross section, and has a concaved bottom 10 and a convex top 11. By providing the boiler with the concaved bottom 10, the heat units from the burner 5 are concentrated beneath the said boiler which causes all waste gas from the burner to be consumed before escaping around the edge of the skirt. This prevents odor from the burner which is common in ordinary constructions.

Arranged around the top of the boiler, and preferably supported by lugs 12, there is a shield 13. The shield may be considered in the nature of a drain trough and has an outwardly bulged portion 14. This bulged portion provides a housing for a perforated tube 15. The tube is supported in the shield by brackets 16. The shield or trough receives the drippings that run down to the edge of the boiler, and the tube 15 has apertures on its underside only so that water which is emitted ahead of the steam is thrown into the trough-like shield and not directly onto the clothes that are steamed as will be apparent as the description progresses. A pipe 16' communicates with the tube 15. This pipe has its passage controlled by a handvalve or cock 17 and the casing of the valve 17 is connected to a short pipe 18 that is coupled to a pipe 19 that enters the toiler at a point adjacent to the top thereof. The pipe 18 also connects with a valve casing controlled by a valve 20, and connected to the casing of the valve 20 and directed into the boiler 9 there is a pipe 21. This pipe 21 has coupled thereto a vertically directed pipe section 22 which is directed through a central opening in the top of the boiler and which is provided, on its outer end, with a nozzle 24. The nozzle 24 is received in a tube 25 which is provided with longitudinal grooves 26, (see Figure 4) that receive therein lugs 27 which project inwardly through the bore of the tubular portion 28 of a spider 29. The spider 29 rests on the top 11 of the boiler 9. The tube 25 is formed on the lower end of a drum 30. The drum is apertured, as at 31, and has a fabric facing 32 which covers the said apertures. As the description progresses it will be noted that by opening the valve 17 the steam will be directed into the perforated tube 15 and will be directed downwardly through the apertures therein, against the bottom of the shell to prevent wet steam from coming in direct contact with the garment. Likewise, by opening the valve 20 the steam will pass through the pipes 19 and 18 through the pipes 21 and 22 and through the nozzle 24 and will be directed from said nozzle into the apertured drum 30. The steam directed through the pipe 21 and 22 will be superheated as will, it is thought be apparent. It will be further noted that while the drum is removably associated with the boiler it is firmly sustained in position thereon. The top of the boiler may be, and preferably is provided with a pet cock 33, whereby the steam can be directed from the boiler for use in the detachable steaming board 50 (hereinafter to be described.)

The boiler is provided with an effectively closed opening in the nature of a hand hole whereby the interior of the boiler may be scraped should occasion require. The boiler is also provided with a drain cock 33', with a sight glass 34, a valve controlled filler spout 35, a gauge 36 and a safety blow-off valve 37.

Adapted to rest on the top of the boiler to enclose the spider and drum, there is the lower member 38 of a hollow form which provides an important element of this invention. The form is apertured, as indicated by the numeral 39, and the said form is enclosed in a fabric casing 40.

The upper and outer section of the form is indicated by the numeral 41. In the showing of the drawings, this section is constructed to receive thereover the upper or waist garments of ladies' wear but it is to be understood that the same may be differently shaped to receive thereon the upper garments of men's wear or children's wear. The section 41 is hollow and is apertured. The form section 38 is provided with outstanding fingers 42 which are designed to be received in suitable notches in the lower edge of the section 41. The section 38 has pivotally secured thereto one end of a spring catch 43, the said catch adapted to be received in a notched keeper 44 in the form section 41. A button is preferably associated with the latch for removing the same from its keeper when the sections comprising the form are to be disassociated.

The neck portion of the form section 41 is provided with a hook 46 whereby this section or both sections when assembled may be suspended from a suitable support.

In the hollow form section 41 there is secured a steam baffle member. The member has a cylindrical body portion 47 closed except for the bottom thereof and two apertures which will be later referred to. The bottom has an outwardly directed inclined or flared flange 48 that either frictionally engages with or is otherwise secured to the inner face of the form section 41. The upturned flange 48 serves as a pan for collecting any water drippings that might collect in the form section 41. The lower edge of the flange 48 is apertured, as at 48', and through these apertures the drippings find an outlet. The cylindrical body 47, adjacent to the closed top thereof, is provided with oppositely disposed apertures 49. These apertures are preferably arranged opposite the arm portions of the form section 41, so that steam will be directed into the said arm portions. The manner in which the garment is arranged on the form, disinfected and steamed to retain the shape thereof, is fully set forth in my referred to Patent No. 1,092,726, so that a detailed description thereof is not believed required in the present application.

In my referred to patent the rear of the form is open, and the said opening is closed by a door that provides a steaming board when swung outwardly to a horizontal position. I have fund that this construction is not practical and, therefore, I provide a steaming board 50 which may be adjustably attached to and removably associated with the form. Also the steaming board 50 may be attached to a wall or any other suitable support should it be found desirable to use the board separately and a part from the steaming machine. In this instance steam is conducted into the steaming board through the pet cock 33. The board is hollow and has its under face rounded inwardly and inclined downwardly from its outer reduced to its inner widened end. The said widened end is also inclined downwardly to the bottom. By this arrangement any condensation of steam in the board will be directed to the deepened end 51 of the bottom. The top of the board is designed to be covered by a suitable fabric. The board has arranged therein longitudinally extending spaced apertured pipe members 52. One end of each of the pipe members 52 is closed, and the second ends of the said pipe members are connected together by a short pipe section 53 which is arranged in the portion 51 of the bottom of the board. The pipe 52 is apertured at its bottom only. To the pipe 53 there is connected a flexible pipe or hose 55 and this hose is designed to be connected to the pet cock 33 on the top of the boiler. The outlet for the board is indicated by the numeral 55′. The steaming board 50 has pivotally secured to its sides, arms 56 that have hook-shaped ends 57 to be received through certain of the apertures in either of the form sections, preferably the lower form section. The rear of the board is also provided with hooks 58 to be received through other apertures in the form. In this manner the board may be effectively held positoned on the form, but as previously set forth, the board may be employed independently of the form.

Figure 10:
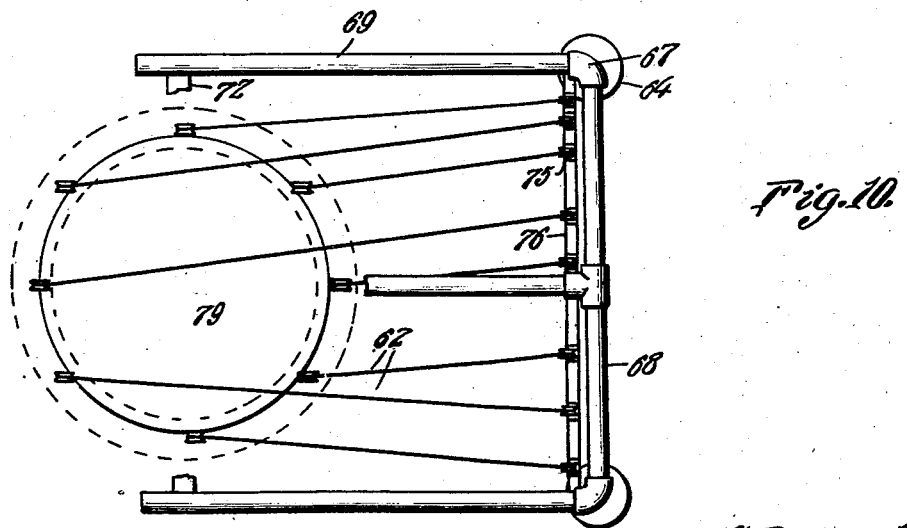
Figure 10 is a sectional view approximately on the line 10—10 of Figure 8.
Figure 11:
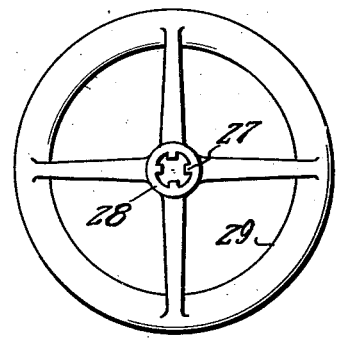
Figure 11 is a top plan view of the spider that provides the support for the drum.
Figure 12:
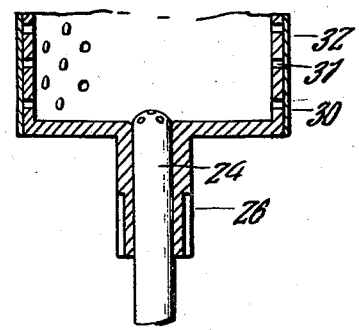
Figure 12 is a sectional view approximately on the line 12—12 of Figure 2.

In order that both the outer and inner surfaces of the garment arranged on the form may be thoroughly affected by the steam directed to both the interior and exterior thereof, I provide a canopy of canvas, duck or like material. The canopy is provided throughout approximately three-fourths of its length with outwardly directed eyes arranged in series. The lower portion of the canopy is received in and has secured thereto an iron ring 61. The iron ring 61 weights the canopy and holds the same in shape. The canopy is provided with an intermediate metal ring 61′ that holds the same from bulging either inwardly or outwardly. Fixed on the intermediate ring 61′ and directed through eyes 60 on the canopy there are cords 62. The supporting device for the canopy includes a standard comprising a hollow lower portion 63 supported on a wide base 64. In the section 63 there is telescopically received the second vertical section 65 of the standard. Binding means 66 hold the section 65 adjusted in the section 63. It should have been stated that two of such standards are employed, as is clearly disclosed by Figure 10 of the drawings. The spaced sections 65 have couplings at their upper ends. Secured between these couplings there is a brace pipe 68 and also secured to the couplings and extending forwardly from the standards there are pipe members 69. If desired, the members 69 may have their outer ends connected by a brace member 70, although this is not essential, as there is fixed on the under face of the said members 69 a ring-shaped top 73. The top 73 has secured on its under face spaced sheave wheels, eight in number, and trained through these sheave wheels there are the cords 62. All of the cords are trained through pulley wheels 75 supported on a shaft 76 between the uprights 65 of the standard. The ends of the cords are secured to eyes of a weighted bar 77. This bar has a depending handle 78. The bar is of a weight to counter balance the metal ring members of the canopy 59 as well as the closed top 79 of the canopy. Thus the canopy can be effectively held in its lowered, partly lowered or fully open position. By reference to the drawings it will be noted that the canopy will spread outwardly in spaced folds between the eyes 60 when the canopy is in folded or collapsed condition. The canopy is of a sufficient length to reach the top of the boiler and when lowered or extended to its full length, the bottom of the canopy will rest outside of the steam shield 13, fitting snugly around the top edge of the shield.

Having described the invention, I claim:—

1. In an apparatus of the class described, a hollow garment form which is apertured and covered with a fabric, said form being constructed of separate sections having interengaging dowels and sockets at the confronting ends thereof, spring latching members also at the said confronting ends, and means for directing steam under pressure both interiorly and exteriorly of the form.

2. The combination with a hollow garment form, of a drum arranged in the lower portion of the form, and comprising a cylindrical member which is apertured and which has a fabric face, a nozzle communicating with the bottom of the drum, means for directing steam under pressure through the nozzle into the drum, and a steam baffle in the upper portion of the form.

3. The combination with a hollow garment form and a boiler having a concaved bottom and a convex top on which latter the form rests, a shield around the top of the boiler having an annular outbulged portion, an annular tube received in the said bulged portion and having apertures on the lower face thereof, an apertured drum in the lower portion of the form, a nozzle communicating with the bottom of the drum, means for directing steam from the boiler through the nozzle and into the tube, whereby steam will be forced against both the interior and the exterior of the form, a hollow baffle member in the upper portion of the form and said baffle member having outlets adjacent to the closed top thereof.

4. In combination, a boiler having a concaved bottom and a convex top, a stand for the boiler, a skirt surrounding the stand, a heater in the stand, a hollow form resting on the boiler, an apertured cloth covered drum in the lower portion of the form, a spider resting on the boiler, a tubular member extending from the bottom of the drum and removably associated with the spider, a nozzle extending through the tubular member and entering the drum and having a pipe connection with the boiler, a shield arranged around and resting on the top of the boiler, an endless pipe member received in the shield and having its bottom apertured, valve controlled means for drawing steam out of the boiler for directing the same into the said apertured tube and for likewise directing the steam into the nozzle for superheating the steam in its passage into the drum and a hollow baffle member in the upper portion of the form having steam outlets adjacent to the closed top thereof.

5. In an apparatus of the class described, a boiler, a hollow apertured form constructed of sections resting on the boiler, means for removably associating the sections of the form, means for directing steam under pressure from the boiler into and against the exterior of the form, and a vertically adjustable canopy for enclosing the form.

6. In an appartus of the class described, a boiler, a hollow apertured form constructed of sections resting on the boiler, means for removably associating the form sections, means for directing steam under pressure from the boiler into and against the exterior of the form, a stand, a cylindrical fabric canopy for the form, an iron ring secured to the lower edge of the canopy, an intermediate iron ring also secured to the canopy, and flexible elements connected to the last mentioned iron ring, eyes on the canopy through which the elements pass, guide means for the flexible elements and a vertically movable counterbalancing weight to which said flexible elements are connected.

In testimony whereof I affix my signature.

CARL R. LENDLE.